R. B. FAGEOL.
ADJUSTABLE BUMPER BAR FOR VEHICLES.
APPLICATION FILED NOV. 27, 1915.
1,175,348.
Patented Mar. 14, 1916.
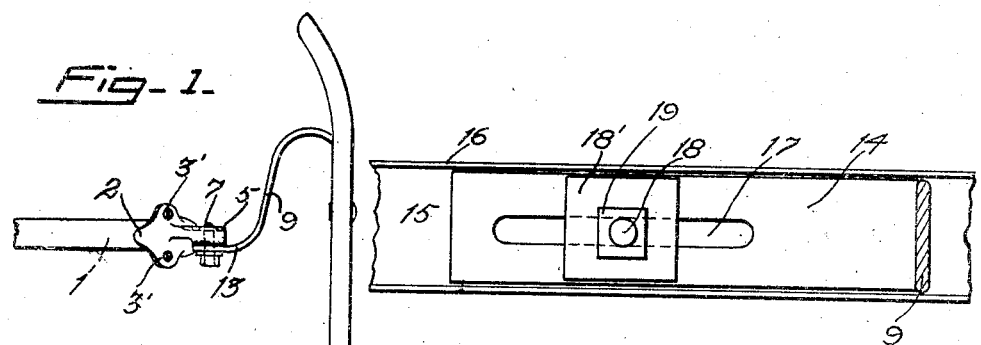
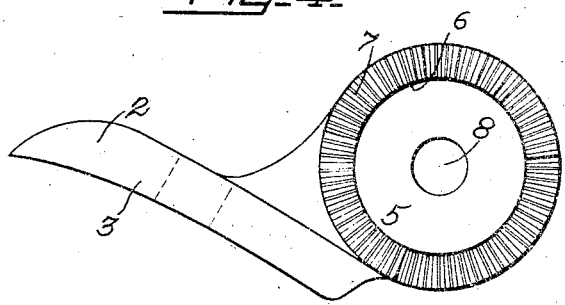
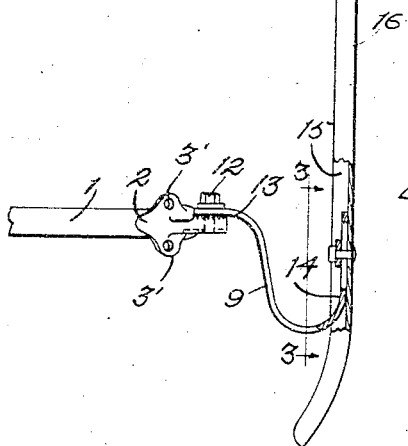
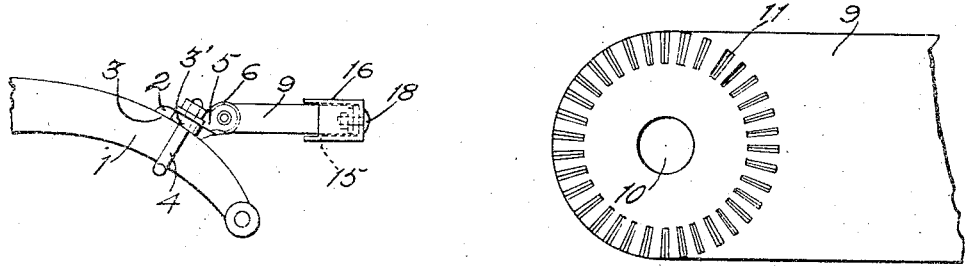
WITNESS
Wm G Drew
INVENTOR.
Rollie B Fageol
BY
Acacia & Totten
ATTORNEYS.

UNITED STATES PATENT OFFICE.

ROLLIE B. FAGEOL, OF OAKLAND, CALIFORNIA.

ADJUSTABLE BUMPER-BAR FOR VEHICLES.

1,175,348.    Specification of Letters Patent.    Patented Mar. 14, 1916.

Application filed November 27, 1915. Serial No. 63,726.

*To all whom it may concern:*

Be it known that I, ROLLIE B. FAGEOL, a citizen of the United States, residing at Oakland, in the county of Alameda and State of California, have invented certain new and useful Improvements in Adjustable Bumper-Bars for Vehicles, of which the following is a specification.

The present invention relates to improvements in vehicle bumper bars and attaching means therefor, and the invention has for its principal objects to provide a bumper adapted to be attached to the front projecting members of the vehicle frame, one which is capable of a vertical adjustment relative to its support thereby providing for the proper adjustment of the bar relatively to the ground, one wherein the bar is secured to the spring supporting members by an adjustable connection whereby the bar is capable of attachment to vehicles having frames of various widths, and one which is capable of being easily attached without the aid of a skilled mechanic and without alteration or injury to the vehicle frame.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in top plan of an embodiment of my invention attached to the front ends of a vehicle frame. Fig. 2 is a view in side elevation of Fig. 1. Fig. 3 is a sectional view taken on line 3—3 of Fig. 1, disclosing the adjustable connection between the bumper bar and one of the supports. Fig. 4 is an enlarged detail view of one of the supporting brackets or bases, disclosing the outwardly projecting teeth or serrations arranged in a circle and radiating from a common center. Fig. 5 is an enlarged detail view of the inner end of one of the supporting arms, disclosing the recesses therein arranged in a circle and radiating from a common center and in which are received the teeth or serrations on the brackets or bases.

Referring more particularly to the several views of the drawings, the numeral 1 designates the front end portions of the sides of the vehicle frame and which are preferably downwardly curved. Resting on the upper surface of each of the members 1 is a supporting bracket or base 2, each curved on its under face as at 3 to correspond with the curvature of the members 1, and said members 2 are formed with the laterally disposed ears 3' provided with bolt receiving openings which are adapted to receive the ends of U bolts 4 which pass under the members 1 and secure the brackets or bases in position thereon.

A head member or lug 5 extends upwardly at right angles from the upper forward end of each bracket or base 2, and the same are formed on one face with the annularly disposed raised portion 6 provided with the radially disposed teeth 7 and are provided centrally of said raised portions with the transversely extending threaded bolt receiving openings 8. The teeth 7 are preferably disposed so as to face the opposite frame member when the bases or brackets are secured in position on the members 1.

Coacting with each head member or lug 5 is the inner end of a spring supporting member or arm 9, formed with a bolt receiving opening 10 surrounded by the annularly disposed indentations or depressions 11 which radiate from the center of the opening 10. A headed cap screw 12 extends through each of the openings 10 and threads into the threaded opening 8 of the respective head members or lugs 5 and secure the spring arms 9 thereto.

The outer portions of the supporting members or arms 9 are curved or bowed outwardly beyond the outer side faces of their respective frames, as at 13, and at their ends are curved or turned inwardly toward each other to provide alined end portions 14 which extend at approximately right angles to the members 1. The outer alined end portions 14 of the members or arms 9 are received in the channel 15 provided in the rear face of a suitable bumper bar 16 which extends transversely of the vehicle frame and projects at each end beyond the sides thereof, as in Fig. 1. The end portions 14 of the arms 9 are longitudinally slotted as at 17 to receive the ends of bolts 18 which pass through the bumper bar 16. The bolts each pass through a washer or plate 18' received in the channel 15 and carry a nut 19. By forming the arms 9 of a width substantially the same as that of the channel 15, the ends 14 thereof when received in said channel will provide a rigid support for the bumper bar.

The slots 17 provide a means whereby the bumper bar and supports are adapted for securing to vehicles having frames of various widths, and the adjustable connection between the bases 2 and the inner ends of the spring supporting members enable the bumper bar to be adjusted vertically and to be retained in its adjusted position by the tightening of the cap screws 12 which force the teeth 7 into the depressions 11.

I have provided a bumper which is capable of being manufactured at little cost, one which is capable of being easily and quickly attached to any make of vehicle having the forwardly extended frame members and without altering the frame, one which is adapted for adjustment to meet the requirements of vehicles of various widths and is adjustable vertically for proper positioning relative to the road surface and is capable of being attached without the services of a skilled mechanic.

By forming the arms 9 as in the drawings and constructing the same of spring material, I provide a support which forms a yieldable connection between the bumper bar and vehicle frame and one which will yield to sudden shocks or strains before becoming bent or broken.

Having thus described my invention what I claim as new and desire to protect by Letters Patent is:—

1. In combination with the side frame members of a vehicle, a bumper comprising spring supporting arms one attached to each of said frame members and projecting at their forward ends beyond the ends of said frame members, the outer ends of said arms being bent or curved outwardly and thence inwardly toward each other to lie at substantially right angles to said frame members, the said arms formed in their forward ends with longitudinal slots, a bumper bar extending transversely of the vehicle frame and formed in its rear surface with a longitudinal channel adapted for receiving the forward ends of said arms, and means extending through said bumper bar and into the slots in said arms for securing the bumper bar thereto.

2. In combination with the side frame members of a vehicle, a bumper comprising spring supporting arms one attached to each of said frame members and projecting at their forward ends beyond the ends of said frame members, the forward ends of said arms being bent or curved outwardly and thence inwardly toward each other to lie at substantially right-angles to said frame members, a bumper bar extending transversely of the vehicle frame, and means for adjustably securing the forward ends of said arms to said bumper bar.

In testimony whereof I have signed my name to this specification in the presence of two subscribing witnesses.

ROLLIE B. FAGEOL.

Witnesses:
HARRY A. TOTTEN,
D. B. RICHARDS.